US006652802B2

(12) United States Patent
Sherwood

(10) Patent No.: US 6,652,802 B2
(45) Date of Patent: Nov. 25, 2003

(54) DIRECT IRON AND STEELMAKING

(76) Inventor: William Lyon Sherwood, 2 Tamath Crescent, Vancouver, B.C. (CA), V6N 2C9

( * ) Notice: Subject to any disclaimer, the term of this patent is extended or adjusted under 35 U.S.C. 154(b) by 0 days.

(21) Appl. No.: 10/102,055

(22) Filed: Mar. 21, 2002

(65) Prior Publication Data

US 2002/0130448 A1 Sep. 19, 2002

Related U.S. Application Data

(60) Division of application No. 09/677,404, filed on Sep. 30, 2000, now Pat. No. 6,383,251, which is a continuation-in-part of application No. 09/148,745, filed on Sep. 4, 1998, now abandoned, which is a continuation-in-part of application No. 08/916,395, filed on Aug. 22, 1997, now abandoned.

(51) Int. Cl.[7] .............................................. C21B 11/06
(52) U.S. Cl. ....................... 266/173; 266/176
(58) Field of Search ................. 266/172, 216, 266/173, 176; 75/384, 382

(56) References Cited

U.S. PATENT DOCUMENTS

| | | | | |
|---|---|---|---|---|
| 3,503,736 A | * | 3/1970 | Sherwood | 75/384 |
| 4,615,511 A | * | 10/1986 | Sherwood | 266/208 |
| 5,163,997 A | * | 11/1992 | Sherwood | 75/527 |
| 5,542,963 A | * | 8/1996 | Sherwood | 75/382 |
| 6,273,932 B1 | * | 8/2001 | Sherwood | 75/414 |
| 6,383,251 B1 | * | 5/2002 | Sherwood | 75/384 |

FOREIGN PATENT DOCUMENTS

WO   WO 99/10544   *   3/1999

* cited by examiner

Primary Examiner—Scott Kastler

(57) ABSTRACT

Solid state iron oxide reduction in a gas-solid reduction zone is combined with continuous melting of the hot solid reduced iron in a fuel-fired gas-solid-liquid melting zone within a rotary furnace. The process includes direct pneumatic transfer of the hot reduced iron by carrier gases through a transfer duct incorporating an injection lance nozzle projecting a jet of hot reduced iron downwards into the metal bath within the melting zone. Oxygen is also introduced into the hot gas stream at selected locations in the melting zone for post-combustion with carbon monoxide generated by a carbon boil and combustion with other combustible gases prior to exit from the rotary furnace, thereby furnishing heat for melting. The hot gas stream is then utilized to provide a significant part of the heat requirement for reduction, prior to exhausting into the atmosphere. A feature is distributing the hot solid reduced iron laterally and longitudinally within the melting zone to enhance heat transfer for melting, including a preferred embodiment comprising continually traversing the jet of carrier gases and hot reduced iron longitudinally forwards and backwards. The invention embraces a broad range of known solid-state reduction processes, classified either as: Group A. those employing gases within a gravity contact-supported or fluidized moving bed at substantial pressures of 1–5 atmospheres; or Group B. solid carbonaceous reductants in a rotary kiln or rotary hearth conducted at near ambient atmospheric pressure. Combustibles in the exhaust gases and unnecessary fume generation caused by direct injection of oxygen into the bath are avoided, as problems endemic to known electric-arc and converter steelmaking technologies. A preferred embodiment applied to Group A reduction includes in situ reforming of a major portion of the hydrocarbons applied as reducing gases in the reduction zone, in combination with reforming a minor portion by partial oxidation with oxygen. The process includes various other preferred features which significantly improve energy requirements, production rates, yields, costs and control of the liquid iron and steel product composition and quality in relation to the prior art.

23 Claims, 8 Drawing Sheets

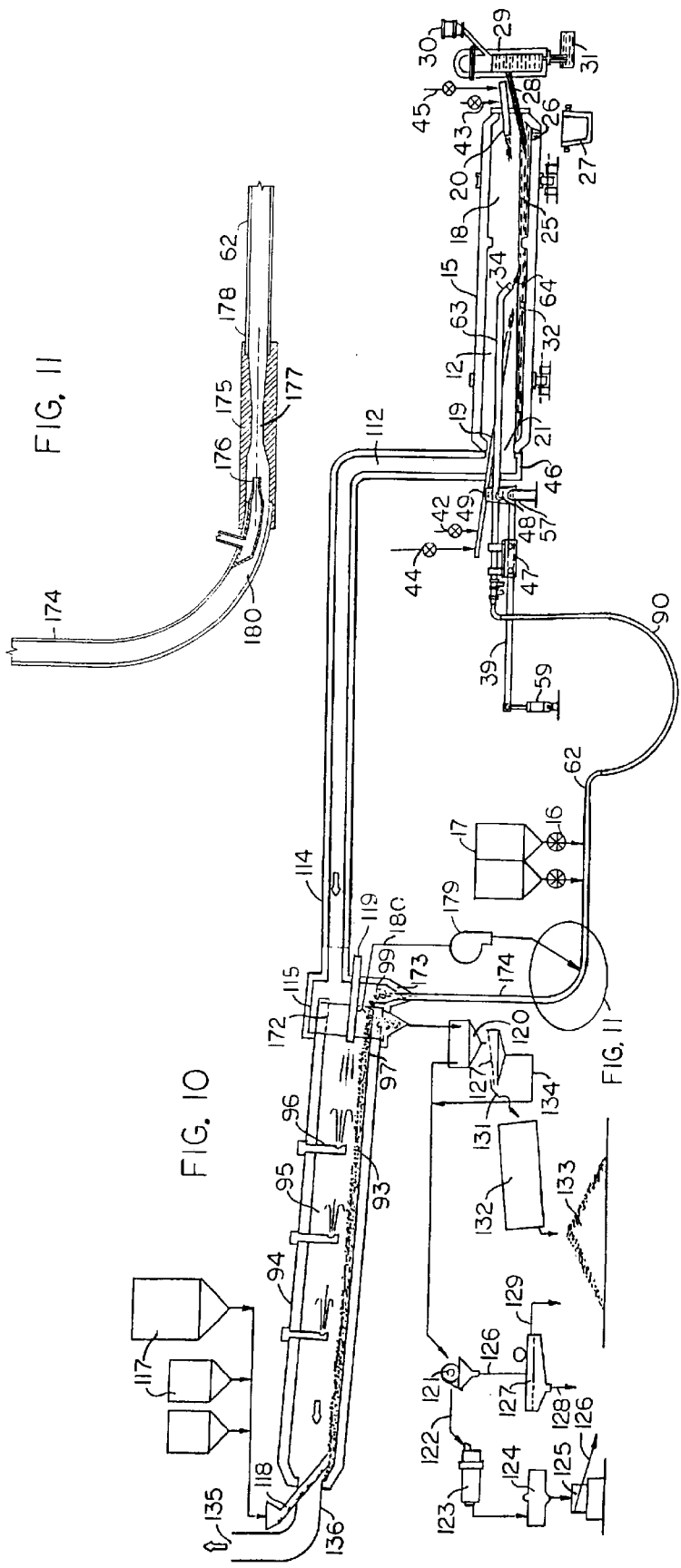

DIRECT IRON AND STEELMAKING

This application is a division of Ser. No. 09/677,404 filed Sep. 30, 2000 now U.S. Pat. No. 6,383,251, which is a continuation-in-part of Ser. No. 09/148,745 filed Sep. 4, 1998, now abandoned, which is a continuation-in-part of application Ser. No. 08/916,395 filed Aug. 22, 1997, now abandoned.

The invention relates to the manufacturing of iron and steel and more particularly, to a process for direct iron and steelmaking.

My U.S. Pat. No. 5,542,963 describes a process for direct iron and steelmaking featuring the combination of solid-state iron oxide reduction by pressurized hot reducing gases followed by continuous melting of the hot reduced iron. This invention comprises a modified process extended to be more versatile, including several improvements and additions. This application is a continuation-in-part of co-pending application Ser. No. 08/916395.

There are a large number of known processes and variations thereof for accomplishing solid-state iron oxide reduction, all of which achieve the object of producing direct reduced iron, known as DRI or sponge iron, as the end product. These may conveniently be divided into the following two groups:

Group A: Solid-state reduction processes employing pressurized hot reducing gases percolated through a gravity contact-supported or fluidized columnar moving bed of iron oxide particles, pellets or lumps, wherein the pressurized reducing gases comprise recirculated top gases enriched by externally reformed hydrocarbons and/or directly introduced hydrocarbons and the in-bed pressure of the reducing gases at product discharge is substantial, typically in the range of 1–5 atmospheres; and Group B: Solid-state reduction processes employing coal or other solid carbonaceous reductant, either mixed with iron oxide pellets or lumps as discrete particles, or as a constituent of agglomerated (pelletized) iron oxides, traversing along elongated and relatively shallow moving beds within rotary kilns or carried upon rotary or traveling hearths, and which include a non-recirculated heating gas phase over the bed, as well as reducing gas phase within the bed generated by in-bed reaction of the coal, and wherein the process gas pressure at product discharge is close to zero relative to ambient atmospheric pressure.

Group A processes for DRI production include, for example, MIDREX, HYL, PUROFER, NIPPON STEEL—DR, and AREX—SBD featuring gravity contact-supported descending moving beds within shaft furnace reactors and the FIOR, FINMET, SPIREX, CIRCORED and CIRCOFER processes in fluidized beds and the iron carbide processes, either with fluidized or gravity contact-supported beds.

Group B processes include SL/RN, DRC, KRUPP—CODIR and ACCAR (with coal) processes employing discrete particle iron-coal mixtures heated within rotary kilns. The FASTMET and INMETCO processes employ pelletized mixtures of fine particulate iron oxide and coal, and COMET alternate layers or iron oxides and a coal/limestone mixture, heated upon. rotary hearths.

An overall object of the present invention is to combine in-process features from known processes in these two in-process groupings within the art of solid-state iron ore reduction together with continuous metal melting, comprising a continuous sequence of process steps to produce liquid iron and steel directly from iron oxides, to realize higher output with improved control of product composition and quality, lower energy requirements, higher metal yield with lower material losses, and lower discharge of environmental pollutants than by currently known processes or combinations of processes.

When considering the solid-state reduction process stage, it is not notable that the ACCAR process, when operated with only natural gas or fuel oil, is an exception outside the two above groupings, because it operates near atmospheric pressure without solid carbonaceous reductant. Between 1967 and 1977, in pilot and demonstration rotary kiln plants operated at near-atmospheric pressures, it was shown that hydrocarbons in the form of natural gas or oil, when injected directly into a hot bed of iron oxide pellets, were reformed into reducing gases ($CO+H_2$) within the bed itself, obviating the need for external reforming. This work was summarized in "Direct Reduced Iron-Technology and Economics of Production and Use", Iron and Steel Society, AIME, 1980, pp. 87–90. Only after about ten or more years was this conceptual breakthrough also applied to Group A processes, for example, AREX technology as an alternative to other shaft furnace technologies which use externally reformed gases for reduction. A wide range of reducing gas makeups are therefore workable, appearing necessary only that approximately suitable temperatures and ratios between H, C and O be maintained in the reducing gas, for sustainable solid-state reduction to metallic iron to proceed. This latitude allows the selection of features for solid-state iron oxide reduction circuits to be more freely focused upon such objects as low process energy requirements, high production rate, low volumes of waste gases containing less particulates and unburned combustibles, improved control of product composition, simplicity and low costs.

The various oxygen converter and electric-arc furnace processes dominate current commercial steelmaking practice, but share a common problem of unburned combustibles CO and $H_2$ contained in the off-gases. The known bath smelting processes also share this difficulty. The development of post-combustion technology has mitigated this problem, but the post-combustion degree (PCD) continues to vary widely during different stages of each heat of steel and substantial excess oxygen via multiple furnace gas-stream injectors is a typical requisite. The heat transfer efficiency (HTE) of in-furnace utilization of the heat so-generated is also relatively low, mainly because of the batch-wise operating mode, typical EAF or BOF geometric shape, and remoteness of the bath from the gas stream exit. Subsequent utilization, such as for preheating scrap, has been only marginally viable as typically somewhat complex and costly to apply in practice. One object of the invention is to realize consistent and near-complete post-combustion including efficient in-furnace heat transfer to the charge, as characterized by uniformly high PCD and HTE and also efficient utilization within the process system of the remaining sensible heat contained in the off-gases from melting, thereby minimizing overall process energy requirements and discharging into the atmosphere only substantially combustible-free exhaust gases at low temperatures.

These current iron and steelinaking processes almost universally feature lancing or sub-surface injection of high-purity oxygen into the bath, typically at high pressures and high velocities in the sonic range. The chemical combination of some of the oxygen with iron generates iron oxide fume which is exhausted as fine particulates, with the effect of reducing metal yields and polluting the environment. Another object of the present invention is to provide a steelmaking process which does not inherently involve injecting oxygen into the bath, using it only when needed for handling specific process materials and special product requirements. A corollary object is to substantially decrease the generation of iron oxide fumes which are typical of current commercial steelmaking processes. Another corollary object is providing the application for low-pressure oxygen of lower purity, such as generated from air separation by molecular sieves, instead of high-purity, high-pressure oxygen.

Still another object of the invention is to release only a minimum volume of exhaust gases at relatively low temperature which are substantially free of combustibles, thereby carrying less heat losses and pollutants into the atmosphere than other overall iron ore reduction and steelmaking combinations.

A further object is to accomplish transfer and immersion of hot solid reduced iron from the reduction stage into a partially melted metal bath at the melting stage with minimum time, heat loss and contact with the ambient atmosphere, furnace gases and steelmaking slag cover.

A still further object is to distribute the hot solid reduced iron pieces at entry into the partially melted metal bath and disperse them sufficiently to avoid the formation of agglomerated floating islands of unmelted iron pieces and in-bath minimize slow mass transfer as a barrier to fast heat transfer and melting.

Yet another object is to employ a minimum quantity of raw materials, additives, fuels, reductants and oxidants in a direct iron and steelmaking process, in which all of the principal process steps can be conducted simultaneously and continuously to yield a continuous stream of liquid iron and steel having a controlled composition and temperature.

As applied to foregoing Group A processes, the invention provides a process for direct iron and steelmaking which comprises introducing iron oxides containing pieces into a gas-solid reduction zone within a reduction reactor fired by pressurized hot reducing gases comprising recirculated top gases enriched by externally reformed hydrocarbons and/or directly introduced hydrocarbons and percolating said reducing gases through said gas-solid reduction zone for reaction with said iron oxides yielding hot solid reduced iron pieces, followed by transferring said reduced iron pieces into a gas-solid-liquid melting zone containing a partially melted metal bath carried within the inner side walls of an elongated rotary furnace having at least a partial top cover of floating slag and fired by combustible and oxygen-containing gases generating a gas stream of hot furnace gases passing above the bath surface supplying heat for continually melting said hot reduced iron to yield liquid iron and steel, said gas stream exiting through an annular end opening of said furnace, including the following steps, in combination: advancing said hot reduced iron along with any accompanying hot reducing gases from within said gas-solid reduction zone into a transfer duct directly communicating between said reduction and melting zones and incorporating an injection lance directed through an annular end opening of said rotary furnace into said melting zone angled downwards towards said bath surface; introducing pressurized carrier gases into said transfer duct entraining and propelling said hot solid reduced iron pieces through said injection lance projecting a jet of said carrier gases and hot reduced iron pieces from said lance penetrating said metal bath surface thereby submerging and dispersing said solid reduced iron pieces within said partially melted metal bath; and dispersing said reduced iron pieces further within said metal bath following said submerging by means of the propelling action of said inner side walls rotating against the bottom perimeter of said metal bath.

Sensible heat contained in the rotary furnace hot combustion products is preferably used as part of the preheat requirement of said hot reducing gases. Externally reforming a minor portion of the enriching hydrocarbons by partial oxidation with oxygen is also a preferred feature, introducing the remaining major portion directly, as followed by in-situ reforming into reducing gases CO and $H_2$ within the gas-solid reduction zone.

When incorporating solid-state reduction under Group B, at or near ambient atmospheric pressure, the invention includes an additional step of advancing the hot reduced iron into a pressurizing zone and applying an elevated pressure therein by introduction of a pressurizing gas. Discrete particles of carbonaceous reductant, as coal char or the like, when present mixed together with the hot reduced iron pieces, are preferably removed by size-separation prior to iron pressurizing; transfer and injection, with the char subjected to cleaning and recycling of this unreacted reductant material. The hot reducing gases emitted from the melting zone are preferably transferred into the gas-solid reduction zone providing supplementary heat for iron oxide reduction.

As applied to both A and B, the principal process steps are preferably and advantageously conducted continuously and simultaneously whilst the charge flows continually from charge to discharge. The process of the invention includes introducing additional oxygen-containing gases, such as by injecting at least 80 percent pure oxygen into the gas stream, which is directed to effectively realize (1) post-combustion of CO evolving out of the bath surface from combination between carbon and oxygen as residual iron oxides contained in the hot reduced iron, and (2) reaction with any combustibles contained in the carrier gases and accompanying hot reducing gases evolving from the jet, forming $CO_2$ and $H_2O$ within the gas stream prior to said stream exiting the melting zone, thereby supplying additional heat for melting. In addition to the distributing and dispersing effects of the solids injection lance stream impact area in combination with furnace wall rotation and slope, a preferred feature is distributing the area of impingement of the jet of carrier gases and hot reduced iron longitudinally along the partially melted metal bath to facilitate the mass and heat transfer requirements for most efficient melting, as by traversing the jet alternately forwards and backwards within the melting zone.

The process preferably includes advancing liquid metal into a gas-liquid refining zone containing a completely melted metal bath carried within the furnace and heated by a discharge end burner supplying a portion of said combustibles and oxygen-containing gases adapted to control the temperature of said melted metal bath essentially independently of the heat requirements for melting within the melting zone, agitating, homogenizing and refining the liquid metal under the controlled agitating action of the rotating furnace side walls to yield liquid iron and steel of controlled temperature and composition. The gas stream of hot combustion products from the discharge end burner also can comprise a substantial portion of the melting heat requirements. The balance of the heat for melting is supplied by post combustion and combustion of gases evolving from the jet, which can be supplemented by a charge end burner firing directly into the melting zone.

Fluxes, alloys and carburizing agents to control and adjust the chemistry of the reactions in the gas-solid-liquid and gas-liquid reaction zones may also be introduced into said transfer duct for entrainment by said carrier gases and injection together with the hot reduced iron. Supplementary iron and steel scrap, pig iron, cold DRI or DRI briquettes may optionally be charged into the melting zone, as well as provision for longitudinally traversing the point of introduction longitudinally forwards and backwards.

BRIEF DESCRIPTION OF THE SEVERAL VIEWS OF THE DRAWINGS

Various other objects, features and advantages of the process and apparatus of this invention will become apparent from the following detailed description and claims, and by referring to the accompanying drawings in which:

FIG. 10 is a schematic of an alternative partial flowsheet incorporating reduction Group B processes, as conducted in rotary kilns; and FIG. 11 is a sectional side view illustrating features of an eductor assembly as in FIG. 10 for accelerating the hot reduced iron pieces for injection.

Figure 1:
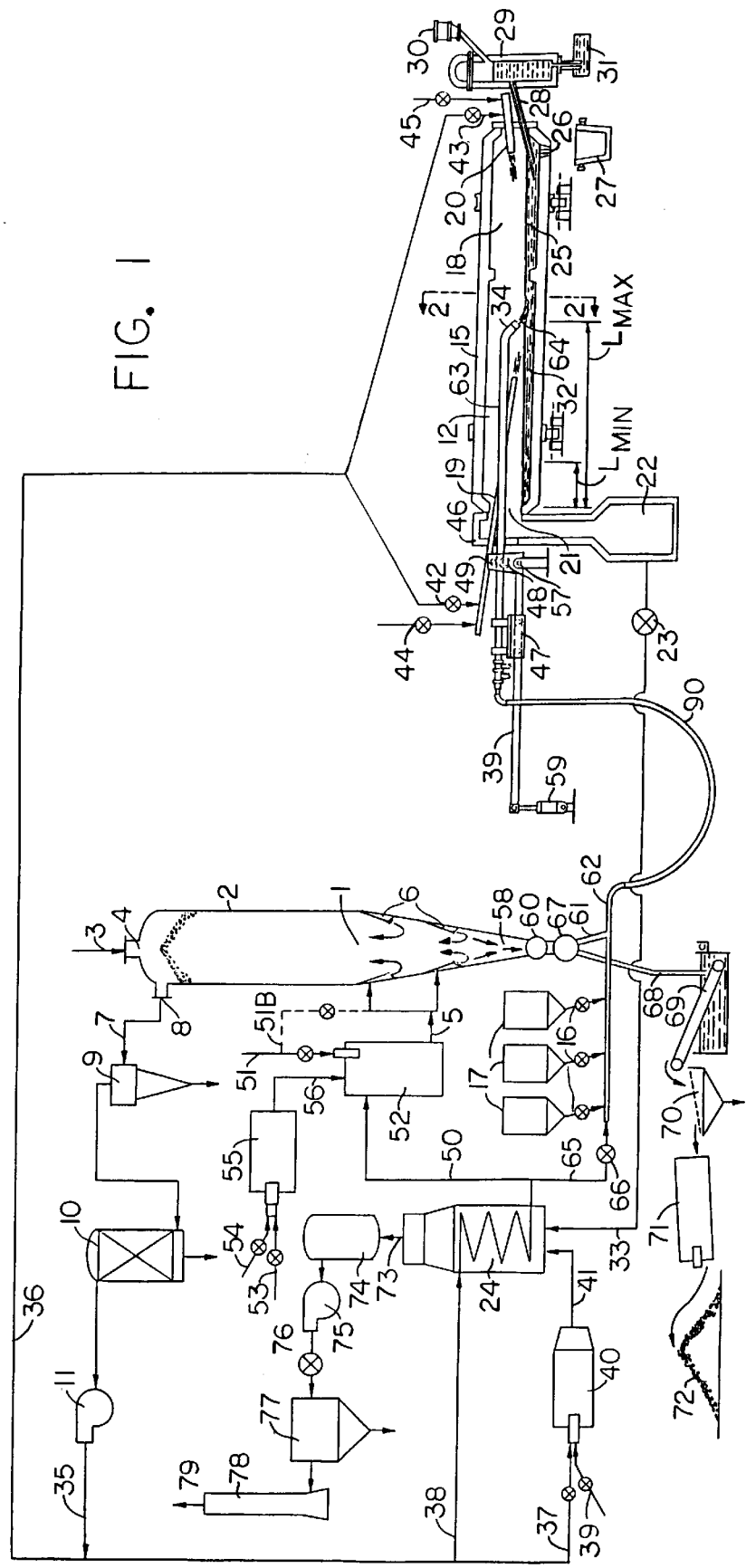
FIG. 1 schematically illustrates features of the process and apparatus of this invention when applied incorporating reduction Group A processes above, utilizing solid-state reduction within a progressively descending contact-supported bed within a shaft furnace reactor.

Referring to the flowsheet FIG. 1, a gas-solid reduction zone 1 is maintained within a reduction reactor 2. A charge of iron oxides containing pieces 3, generally as lumps or pellets, are fed via at least one reactor feed inlet 4 to comprise a contact-supported bed progressively descending by gravity, through the interstices of which pressurized hot reducing gases 5 introduced via inlets 6 percolate upwards through zone 1, countercurrent to the general movement of the solid charge, reacting with the iron oxides to yield hot reduced iron 58. The reacted top gases 7 exit via outlet 8 leading into cyclone 9 for removal of particulates and on to cooler-scrubber 10 effecting removal of $H_2O$ prior to repressurizing by recirculating compressor-blower 11.

At the same time, a gas-solid-liquid melting zone 12 containing a partially melted metal bath 32 is maintained within rotary furnace 15 wherein hot charge material discharged from zone 1 is melted. Zone 12 is optionally followed by a gas-liquid refining zone 18 where charge composition and temperature are adjusted and stabilized prior to discharge. The zone(s) are fired with combustible and oxygen-containing gases introduced, as required, by a charge-end burner 19 and a discharge-end burner 20. The gas stream of hot combustion products pass counter-current to the general charge movement exiting via annular charge end opening 21 into an exhaust duct system which may include a gas-conditioning chamber 22 for removing particulates and a pressure-control damper 23. The hot gases 33 then supply heat input for recirculated top gas heater-recuperator 24. Discharge of liquid metal 25 can be via a tap hole 26 into a ladle 27, or via a siphon tube 28 into a vacuum vessel 29 which, as well as lockhopper 30 for alloying, deoxidation and fluxing additions, may incorporate features for gas bubbling, oxygen injection, heating and the like, prior to discharge, for example, into a launder or tundish 31 for feeding a casting machine.

In the embodiment illustrated, the reacted, dewatered and pressurized top gases 35 are divided into three gas streams. The first stream 36 is utilized as fuel 42, 43 for burners 19 and 20, as also supplied with oxygen 44 & 45. A second stream 37 is combusted with air or oxygen in direct-fired heater 40 to yield heated gases 41 which, together with hot combustion product gases 33, make up the total heat input for heater-recuperator 24. The exhaust gases 73 then pass via a cooling chamber 74, preferably using water spray-mist, through exhauster 75, damper 76, dust collector 77 into the atmosphere via stack 78. Cooled, cleaned waste gases 79 thus appear as the only waste gases emitted by this flowsheet, which are substantially free of combustibles and particulates. The third and major stream 38, after passage through heater-recuperator 24, furnishes hot recirculated top gases 50 ready for enrichment, temperature adjustment and recirulation into zone 1.

As illustrated, hydrocarbons 51 are introduced into mixing chamber 52 as reducing gas makeup. Hydrocarbons 51 B may optionally be introduced directly as an unmixed component of reducing gases 5. When in the form of fuel oil, hydrocarbons 51, 53 are suitably atomized, for which a minor portion of pressurized top gases 35 can be applied as the atomizing medium. In order to balance the energy and oxygen requirements of the flowsheet illustrated, hydrocarbons 53, suitably about one-third of the total makeup, are partially combusted with oxygen 54 in a gas generator 55, yielding hot reducing gas 56 predominantly comprising CO and $H_2$. Pressurized hot reducing gases 5 thus comprise a mixture of hot recirculated top gases 50, fresh hydrocarbons 51, 51B, and partially oxidized components 56 of hydrocarbons 53.

Numerous solid-state reduction process variations are available derived from known processes. For example, a flowsheet could include prior reforming of all of the makeup hydrocarbons, either before introduction into the top gas recirculation circuit (HYL), or combined with it (MIDREX). It could include steam as a reformer (HYL) or air as a partial oxidation agent (AREX). It could include removal of recirculating $CO_2$, such as by hot potassium carbonate scrubbing (PUROFER) or mono-ethanol-amine absorption (NIPPON STEEL & IRON CARBIDE), or PSA absorption (HYL). Reduction zone 1 can also be operated at various pressures from about 1 atmosphere to more than 5 atmospheres, significantly increasing production rate as pressure increases (NIPPON STEEL). Appropriate adjustments are involved in each case to meet operating ranges for material balance of C, H and O in combination with energy balance for satisfactory reduction temperatures.

Whilst a large number of different reducing gas recirculation circuits thus are feasible, this particular one is considered uniquely advantageous because the extra oxygen required as makeup, in addition to that supplied by the iron oxides, is met without introducing diluent nitrogen to slow down the gas-solid reduction reactions and absorb heat for reheating each time around the circuit, at the same time supplying a substantial part of the makeup heat requirement by direct reaction in the partial reformer, avoiding additional energy losses characteristic of indirect heat exchangers and external reformers. Also, a substantial part of the makeup hydrocarbon gas is already reacted into CO and $H_2$ preceding reactor entry, thereby being ready for immediate iron oxide reduction and reducing the amount of temperature loss by the endothermic cracking of hydrocarbons within the gas-solid reduction zone. These advantages are immediately evident from a material and energy balance comparison with reduction process prior art.

Hot reduced iron 58 confined together with pressurized hot reducing gases at the bottom of reactor 2 is maintained ready for transfer on to the gas-solid-liquid melting zone 12. A rotary valve 60, enclosed screw or other known mechanical device can be used to control the iron transfer rate through conduit 61 connecting into transfer duct 62 which connects into injection lance 63, adapted for projecting the hot reduced iron through opening 21 into partially melted bath 32 within gas-solid-liquid melting zone 12. In normal operating mode the hot reduced iron 58, along with hot reducing gases leaked from zone 1 through valve 60, pass into transfer duct 62. Pressurized hot carrier gas 65, drawn as a minor part from the recirculated pressurized hot top gases 50 in the embodiment illustrated, is introduced into transfer duct 62 within which it combines with the solid reduced iron and any accompanying reducing gases introduced from conduit 61 entraining and propelling the hot reduced iron through injection lance 63 incorporating a lance nozzle 34 angled downwards and directed towards the surface of bath 32 projecting a jet 64 into partially melted metal bath 32. Regulation of the gas flow rate by means of control valve 66 then controls the gas flow and velocity of jet 64, and thereby the depth of penetration of the hot gases and reduced iron pieces into bath 32 upon impingement with the bath surface. Additives 16, such as fluxes and alloys and carburizers, may be injected together with the hot iron, such as introduced from pressurized additive feed hoppers 17, also connecting into transfer duct 62 and utilizing feed rate controls according to known pneumatic feeding and conveying practice.

Figure 2:
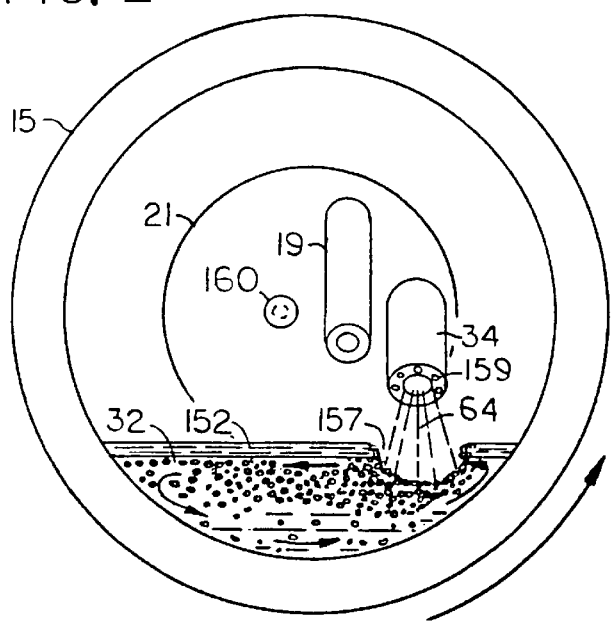
FIG. 2 is a section view along plane 2—2 of FIG. 1.

The density of pieces of hot reduced iron is typically in the range of 2.0–3.8 g/cc, as compared to slags of 3.1–3.5 g/cc and metal bath in area of 7 g/cc. Initially, then, the tendency is for the solid reduced iron pieces to rise after impact and float on the metal with top caps projecting somewhat above the bath surface into the slag layer. Also, when a piece or pellet of reduced iron is immersed in a liquid iron bath, a solid shell or surface crust of frozen melt typically forms initially on the pellet surface before remelting this crust and melting the pellet on to complete dissolution. Melting occurs by a combination of heat and mass transfer and the subject system, when operating with lance nozzle 34 stationary, concentrates a relatively large mass flow rate of unmelted material into the impact area of jet 64. For example, if hot reduced iron 58 is being generated at the rate of 60 tons per hour, as typical of a modest-sized shaft furnace reduction, about 33 pounds of iron per second is propelled into bath 32. Lacking a positive mechanism dispersing the unmelted iron pieces, they can remain concentrated in the bath area around the impacting jet, even possibly agglomerating and creating floating islands of predominantly still solid reduced iron pieces. Referring to FIG. 2, it is seen that the invention provides such a dispersing mechanism by the propelling action of the inner side walls of furnace 15 rotating against the bottom perimeter of bath 32, acting in combination with the dispersing force of the piece velocity in jet 64. The dispersing effect can be increased by increasing furnace rotating speed, even up to ten or more revolutions per minute. Increasing the angle of furnace incline also increases the longitudinal component of the dispersing movement.

As the rotary furnace size and also the ratio of length to diameter within the zone 12 refractory walls is increased, it is increasingly difficult to spread the melting heat requirements similarly to the heat release availability from the hot furnace gas stream and refractory walls throughout melting zone 12 by relying mainly on jet velocity, furnace rotation and sloping for dispersion of unmelted iron pieces. One option is to employ additional solids injection nozzles or lances spread at intervals along zone 12. As another option and a preferred feature of the invention in the embodiment illustrated, lance 64 is adapted to provide variable positioning and traversing of nozzle 34 within melting zone 12, forwards and backwards in the longitudinal direction.

Cantilevered lance 63, as supplied with hot reduced iron via transfer duct 62 incorporating flexible hose section 90, is carried between a fixed troughed supporting guide roller 48 and retractable/releasable pinch idler roller 49, with lance entry end clamped onto moving carriage 47 incorporating support guide rollers running on a longitudinal guide track 39. Traversing and/or setting the distance of insertion of nozzle 34 into melting zone 12, for example, can be accomplished by a reversible variable speed hydraulic or electric motor driving roller 48, having end travel and intermediate positioning points based on limit proximity switches along track 39 sensing the position of carriage 47. Vertical adjustment can optionally be included, such as by cylinder 59 vertically rotating track 39 about a pivot 57. The lance access opening through charge hood 46 is appropriately sealed, at least partially, such as by an annular gas curtain and is preferably elongated as a vertical elongation covered by a removable panel or door during operation, to allow clear passage of angled nozzle 34 during lance insertion or removal for maintenance and the like. Example apparatus variations would include substitution of linear bushings in place of roller assembly 48, 49 and carriage 47, and traversing actuation by means of ball screws or a longitudinal hydraulic cylinder.

Figure 3:
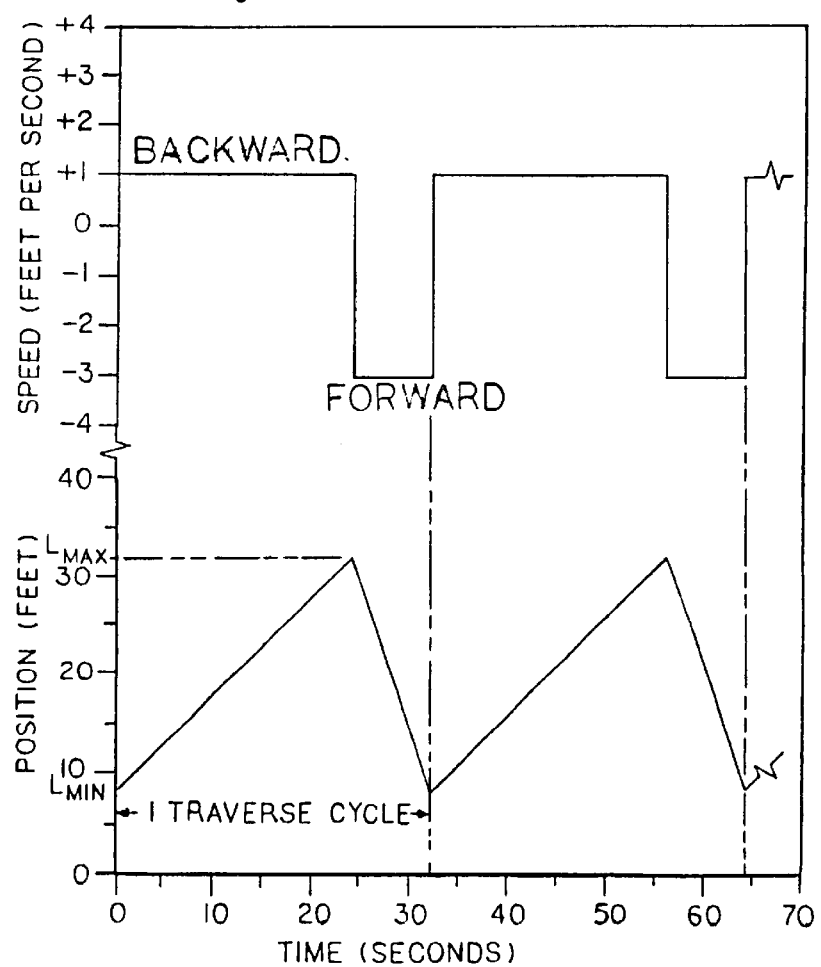
FIG. 3 is a graph of an exemplary longitudinal traverse cycle of a lance adapted for injection of hot solid reduced iron into the gas-solid-liquid melting zone.

The hot reduced iron can be longitudinally distributed by continuously traversing lance nozzle 34 between a maximum inserted length Lmax and minimum inserted length Lmin. For example, graph FIG. 3 illustrates a cycle in which the nozzle traverses backward from position Lmax at a uniform speed of 1 ft./second until it reaches Lmin, where it reverses and returns to Lmax at 3 ft./sec, when the cycle is repeated. Increasing the speed of nozzle travel in one direction relative to the other, as in the illustration, is perhaps the simplest method of minimizing the effects of sudden and cyclical "double dosing" adjacent to the reversing points. In order to meet preferences for concentrating the solids in a particular area., the lance travel speed pattern can, of course, be changed in steps, or accelerated and decelerated according to the pattern desired. A principal consideration in selecting the Lmax position is the completion of melting prior to molten iron exit from the melting zone 12. An Lmin setting close to charge end opening 21 assists with full use of available heat transfer areas, avoids unnecessary localized superheating of bath 32 at the charge end and reduces the temperature of hot gases 33. Conversely, at small Lmin, there may be insufficient time for reaction of combustibles contained in the carrier gases to form $CO_2$ and $H_2O$ prior to their exit from opening 21. A gas sampling and analysis system continuously monitoring the combustible and oxygen content of gases 33 can appropriately assist with selecting the most suitable Lmin distance. The distance Lmax- Lmin would preferably be at least half the total length of zone 12, usually in the range 70 to 90 per cent.

As seen in FIG. 2, the moving furnace walls cause a general movement of metal proximate the bath bottom in the direction of wall rotation, which results in a compensating movement in the opposite direction near the bath surface, shifting unmelted charge laterally away from the lance path during the time interval between the two passes of each cycle. Locating the lance path on the upstream side of the lateral metal movement near the surface, as illustrated, tends to distribute the unmelted iron across the width of the bath throughout the operating period.

As illustrated, nozzle 34 is angled downwardly at an angle of approximately 45 degrees and pointed towards the discharge end of furnace 15, but could be any suitable acute angle up to 90°, perpendicular to the bath surface. Steep angles increase jet penetration depth and shallow angles favor more turbulent mixing of spent carrier gases with furnace gases and oxygen, and longer in-furnace time, therefore more heat transfer and complete combustion of contained combustibles prior to their exit from opening 21.

In the embodiment illustrated in FIG. 1, conduit 61 incorporates a diverter valve 67 adapted to divert hot reduced iron 58 via alternate conduit 68 into a water quenching 69, dewatering 70 and drying 71 process sequence to yield cold direct reduced iron 72 as an intermediate alternative product. Also included is capture and recycling of hot reducing gases leaked through valves 60, 67, such as by venting conduit 68 and piping the gases to the inlet of blower 11. It is to be noted that shaft furnace infeed pellets or lump ore are typically sized to be larger than 3 mm and the reduced iron 58 is similar, except for the addition of minor quantities of fines by in-process degradation. Since the ratio of wetted surface area to weight is correspondingly low, then by limiting the moisture pick-up during quenching essentially to surface wetting only, only a minor quantity of moisture is picked up. By limiting quenching time to discharge the wetted pellets at elevated temperature, usually somewhat above 100 C., they are essentially self-drying during cooling, yielding a cooled dry reduced iron intermediate product without a requirement for external drying heat. This cold direct-reduced iron can be re-introduced as another additive for melting, such as via pressurized hoppers 17, thereby avoiding any yield loss of liquid iron and steel. Another advantage of quenching is the opportunity to add a passivating coating agent dissolved or suspended in the quench water to minimize reoxidation during storage or shipment of cold DRI pellets, thereby eliminating necessity for a subsequent passivating step by spraying or the like.

Figure 4:
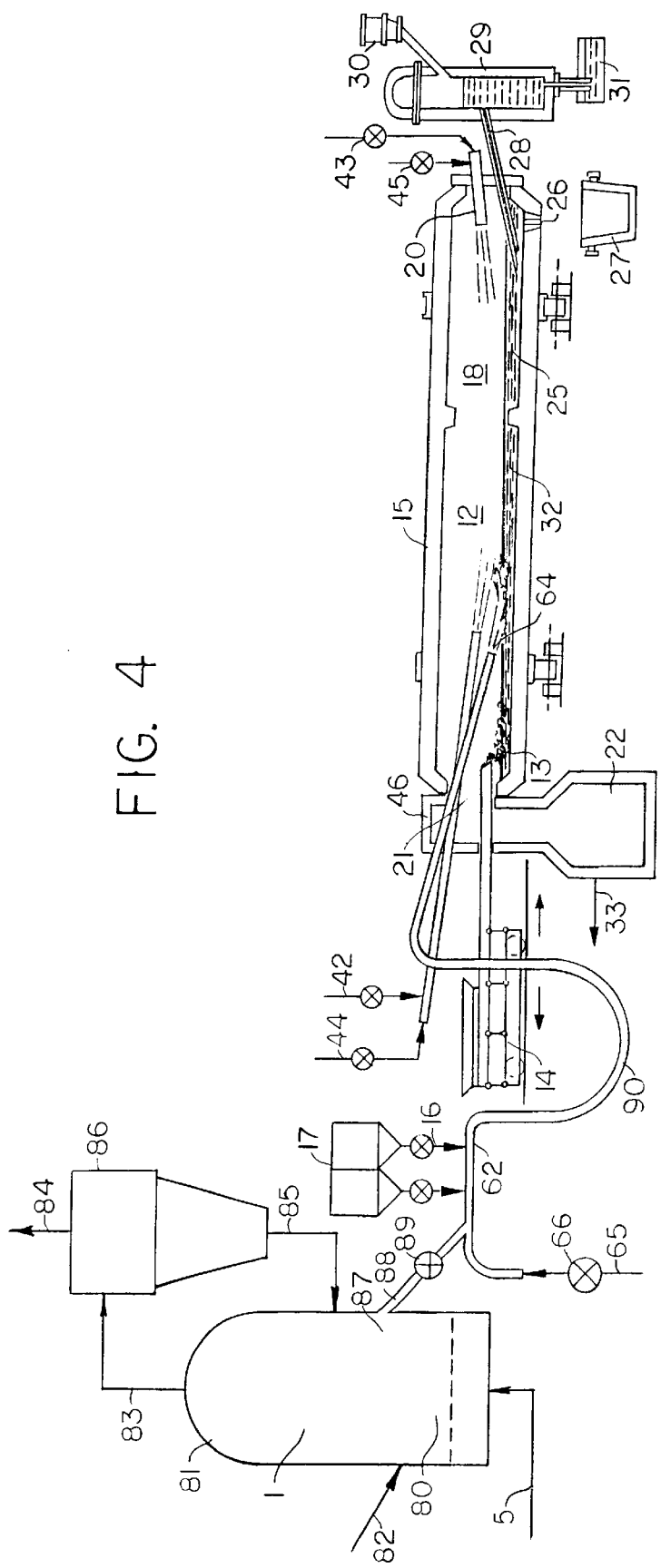
FIG. 4 is a schematic partial flowsheet incorporating reduction Group A processes but within a fluidized bed reactor.

FIG. 4 illustrates a flowsheet with Group A solid-state reduction, but with fluidized rather than gravity contact-supported beds. A fluidized bed 80 is confined in a gas-solid reduction zone 1 within a reactor 81 fed with iron oxides containing pieces 82 which are fluidized by pressurized hot reducing gases 5. The illustration is very abbreviated, omitting various features and variations which would be evident from the numerous known and applicable fluidized bed iron ore reduction process technologies. These generally process smaller iron oxides containing pieces less than 3 mm and employing bubbling and recirculating fluidized beds in various flowsheets and mechanical configurations. Top gases 83 generally carry heavy loadings of charge and, like the shaft furnace processes, a major portion of cleaned top gases 84 is usually dewatered, pressurized, heated, enriched and recirculated, after separating out most of the charge particles 85 in cyclone 86 and returning them to fluidized bed 80. The hot solid reduced iron 87, which can range from low-carbon metallic iron through carburized iron to nearly pure iron carbide $Fe_3C$ plus free carbon, similarly passes through a conduit 88 at a rate regulated by flow rate control valve 89 into transfer duct 62 where it is picked up by pressurized carrier gas 65 for injection into gas-solid-liquid melting zone 12 via an injection lance 63, in a jet 64 emitted from nozzle 34. The lance traversing features in FIG. 1 are not illustrated, as benefits may be marginal in some circumstances, such as when supplementary metallic charge materials 13 in the form of iron and steel scrap, HBI briquettes, or the like are fed into zone 12 by other means, such as by an oscillating feed conveyor 14, to comprise a substantial portion of the charge into melting zone 12. As illustrated, feed conveyor 14 may ride on wheels running on a track longitudinally aligned with furnace 15, and adapted to provide forwards and backwards traversing of the conveyor and thereby longitudinal distribution of the entry position of charge materials 13, which are then further advanced and dispersed within bath 32 by the action of the rotating inner furnace walls in combination with downward slope of furnace 15. Fluxing and alloying materials, or cold reduced iron pellets as additives 16 may also be fed from pressurized hoppers 17. Incorporating a flexible hose section 90 into transfer duct 62, both typically comprising heat resisting alloy and externally insulated, facilitates locating reactors 2 or 80 at any desired level or location relative to furnace 15 and also adjustment of the insertion distance and angle of injection pipe 63 into zone 12, even when not required for lance traversing. Facilitating the sealing of charge hood 46 when mounted to float with the movement of rotary furnace 15 is another advantage, particularly if injection pipe 63 is directly supported by charge hood 46.

Provision for diversion, cooling and discharge of the hot reduced iron, analogous to FIG. 1, of course, can be included, but naturally requires more extensive dewatering and drying measures because of the much smaller piece sizes or, alternatively, indirect cooling without any direct water quenching may be applied, as well known in the art of direct reduction. Also analogous to FIG. 1, hot gases 33 are routed to a heater-recuperator which preheats fluidizing reducing gases 5. A typical fluidized bed iron carbide reduction circuit, for example, employs an externally fired supplementary heater for preheating to the 1200° F. area, as replaceable by utilizing heat contained in gases 33.

Figure 5:
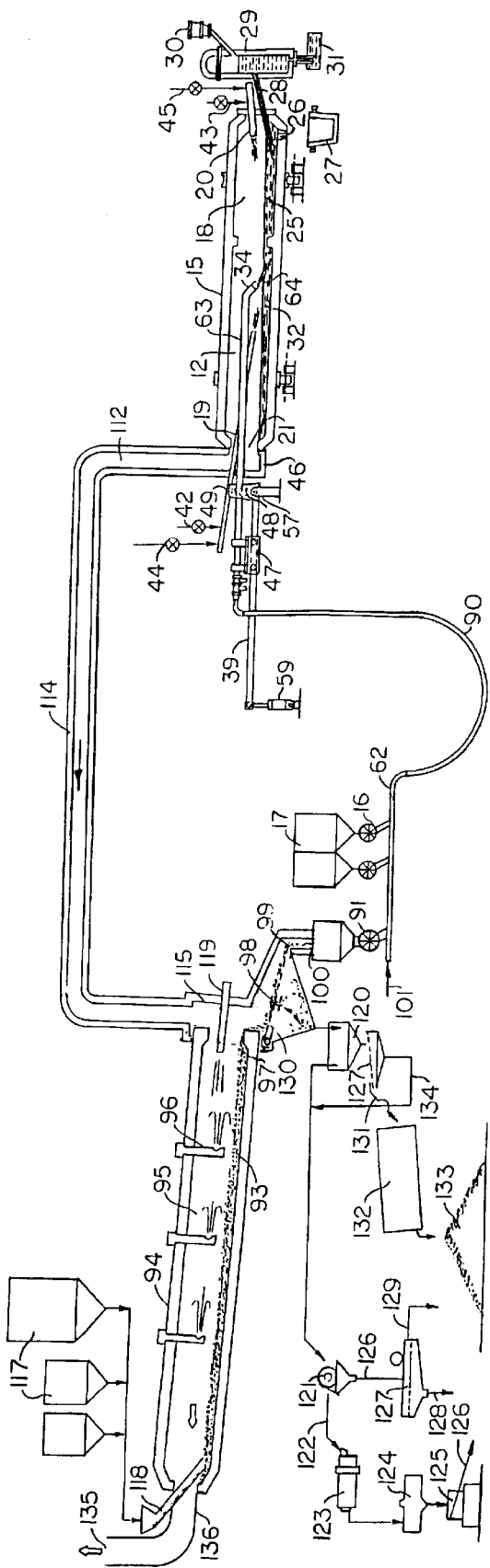
FIG. 5 is a schematic partial flowsheet incorporating reduction Group B processes, as conducted in rotary kilns.

FIG. 5 illustrates a flowsheet in which the solid-state reduction is a Group B process with gas-solid reduction is carried out within an elongated moving bed 93 which is continually advancing by rotation of a slightly down-sloping rotary kiln reactor 94. Charge components, typically comprising iron oxide containing pellets or lumps, coal, coal char and limestone or dolomite as a sulphur-adsorbent are fed from bins 117 by means of controlled rate feeders into reactor 94 via a common conveyor or charge chute 118. The reductant for most rotary kiln reduction technologies is coal or char intermixed with the iron oxide as separate discrete particles which, upon heating, react to form reducing gases CO and $H_2$ within bed 93 yielding a reacted mixture 97 comprising pieces of hot solid reduced iron, coal char, residual ash and sulphur-adsorbent fluxes. The coal/coal char also furnishes a major part of the total heat requirement, air or oxygen being introduced through ports or burner pipes 96 at intervals along reactor 94, or discharge end burner 119, which may be supplemented with liquid or gaseous fuel, if required to maintain the desired reaction temperature profile. As discrete pieces, the coal and fluxes of charge mixture 92 can conveniently be sized smaller than the iron oxides containing pellets or lumps, facilitating a separation by means of enclosed hot screen deck 98 usually at about 6 mm, to yield a continual flow of substantially clean hot reduced iron 99 as oversize pieces ready for direct transfer to melting zone 12. The screen deck 98 typically is vibrated and the screen bars may be internally water-cooled and/or comprise heat resisting alloy construction. The screening optionally can also include a top deck (not illustrated) with openings sized appropriately for scalping off any large chunks of agglomerated charge, directing them into an appropriate closed hopper including a gate for periodic discharge.

As well as components of charge mixture 92, coal and char can be introduced along bed 93, such as by pneumatic injection which is common practice in the art of iron reduction in rotary kiln reactors. Gas flow is generally countercurrent to the bed movement within gas-solid reaction zone 95, exhaust gases 135 exiting the charge end opening via charge hood 136 into an appropriate cleaning and discharge system, optionally including recuperation of sensible heat.

The hot reduced iron 99 may be discharged through a chute and surge hopper 100 submerging the inlet of a rotary valve 91, or alternative such as a screw or gate-lock feeder, discharging the material into transfer duct 62 for entrainment by carrier gas 101, projecting the reduced iron through duct 62 to lance 63. The rotary valve 91 would typically be of the offset type, preferably including other special features known in the art of rotary airlock valves when feeding relatively hot and large-sized pieces in pneumatic conveying systems. Since, unlike Group A where gas-solid reduction zone pressures are typically higher than 1 bar, Group B solid-state reduction processes characteristically are controlled to a set point typically within ±3 mm water column of ambient atmospheric pressure, leakage and backflow of carrier gas through valve 91 can represent a significant quantity of gas. Optionally, a major portion of this gas can be vented to atmosphere or vented to the carrier gas pressurizing circuit for recycling.

Pressurized carrier gas 101 is most conveniently supplied from an external source, since hot pressurized recirculating gases are not inherently available from the process flow. Other alternatives include pressurizing a portion of gas-solid reduction zone exhaust gases 135, or inserting a carrier-gas inlet duct into the gas-solid reaction zone through hood 115, then pressurizing the kiln gases using a high-temperature blower, to comprise carrier gas 101. As these reduction-zone gases are hot, with composition usually reducing or neutral towards hot reduced iron, reoxidation and temperature loss during transfer are minimized with this option. The hot combustion product gases 112 exiting gas-solid-liquid reaction zone 12, characteristically in the area of 1600 C. and containing only minor quantities of unburned CO, $H_2$ and hydrocarbons, can be transferred via exhaust transfer duct 114 into gas-solid reaction zone 95 to furnish part of the heat requirement therein. Note that stationary enclosed heads 115, 46 which are preferably sealed at the junctures with the rotary furnaces, also incorporate the various items of transfer equipment. Duct 114 may also include a by-pass, such as for exhaust discharge when reactor 94 is not operating and alternatively, exhaust gases 112 may be utilized for air, oxygen or fuel gas preheating or for oxide pellet preheating, etc. The near-complete reaction of combustibles to $CO_2$ and $H_2O$ within zone 12 is typically less important for Group B than Group A, as there is a second opportunity in the gas-solid reduction zone for these gases to complete in-process combustion, whereas in Group A they are typically utilized only for recuperation by indirect heat transfer.

The hot screening undersize suitably discharges into a quench 120, followed by wet magnetic separation 121 to recover the iron 122 for recycling, for example, on to fine grinding 123, dewatering by thickening 124 and filtering 125, for addition as a component of the mixture for iron oxides balling and pelletizing. This iron 122, 126 could also be applied as a melting additive 16, 17. The non-magnetics 126 may be wet-screened 127 to pass the undersized fine ash and hydrated sulphur-adsorbent 128 to a waste settling pond. The oversized coal char 129 can be dewatered and then recycled to comprise a portion of the solid carbonaceous reductant in bed 93. Known solid-state rotary kiln reduction has also been applied to reduction of iron ores and concentrates which are balled, such as by a disk or drum pelletizer, and charged in the moist green, pre-dried, dried and pre-heated condition, or pre-hardened by a low-temperature curing process, without prior induration by heating at high temperature. In such a case, recycled coal char, after appropriate comminution, can be mixed with the concentrate prior to balling to comprise a constituent of the pellets for reduction, thereby also comprising a component of the solid carbonaceous reductant. Fresh carbonaceous material can also be added to such pellets, whereby the combined recycled and fresh carbonaceous material contained in the pellets may comprise a substantial portion, or even all of, the solid carbonaceous reductant employed in the gas-solid reduction zone. At high levels of contained carbon in the pellet charge materials, screening 130 and the recycling circuit 121–129 becomes largely superfluous. The entire reacted mixture 97 can also be by-passed to quench 120, such as by rotating a hinged screen bar entry section 130, followed by wet cold screening 127, with the oversize 131 being directed to drying 132 to yield cold direct reduced iron pellets 133 which can be introduced into zone 12 either directly or injected as another additive 16, 17. Wet screen undersize 134 may rejoin the fine-sized material cycle just described.

Figure 6:
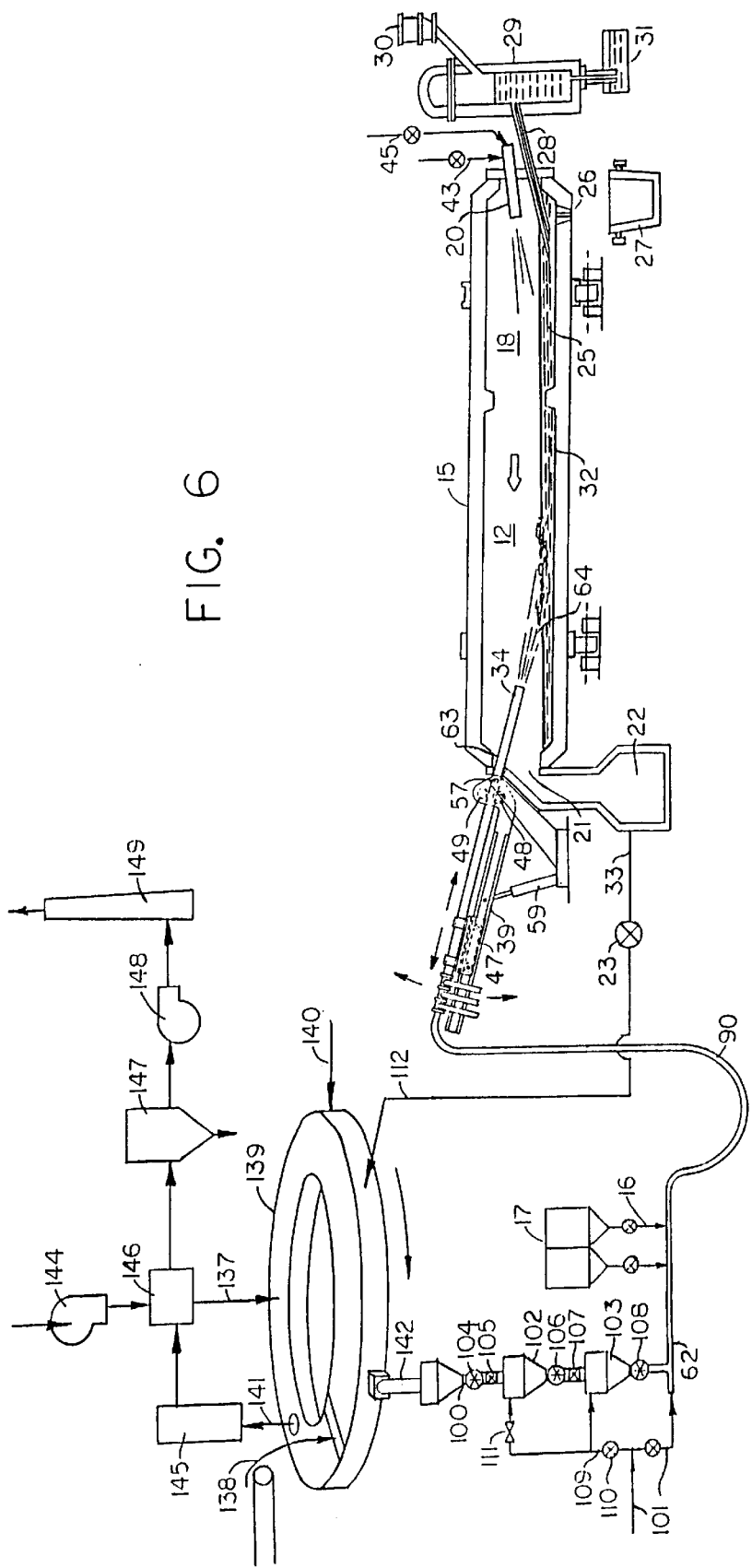
FIG. 6 is a schematic partial flowsheet incorporating reduction Group B processes, but as conducted on a rotary hearth.

FIG. 6 illustrates Group B gas-solid reduction in which a charge 138 comprising formed pellets of mixed fine-sized iron oxides containing pieces and coal is distributed as a thin layer upon a rotating hearth within rotary hearth furnace reactor 139. Heating fuel 140 is typically introduced via burners at intervals along the hearth and preheated combustion air 137 from blower 144 is also distributed to control charge temperature profile and complete the combustion of the hearth gases. Interior gas flow is countercurrent to the hearth rotation and exhaust gases 141 exit close to, or coincident with, the feed of charge 138. Rotary furnace combustion product gases 112, are appropriately channeled into furnace 139 providing supplementary heating. Gases 141 typically pass through a conditioner 145, heat recuperator 146, dust collector 147, exhauster 148 and stack 149. Since the solid reductant is a constituent of the pellets, they can be passed directly into the hot transfer and injection system without screening. Illustrated is an alternative system applicable to higher transfer pressures, also without carrier gas backflow, as particularly applicable for transferring the hot reduced iron over long distances preceding injection. The hot reduced iron is passed through a closed chute into surge buffer hopper 100, which intermittently discharges into hopper 102, as alternatively pressurized for transfer into continuously pressurized hopper 103 and depressurized to receive hot reduced iron from hopper 100. The system incorporates suitable isolating and control valve means, such as solids flow control valves 104, 106 and sealing valves 105, 107. Hopper pressures optimally can be controlled by a regulator 110 on branch carrier gas line 109, also including a shut-off valve 111 having closure synchronized with opening of valve 105. Surges of reduced iron from hopper 103 into transfer duct 62 may be evened out, such as by a rotary or a metering valve 108. Alternatively, a two-position gate can be employed at 107, alternately diverting hot reduced iron directly into either of two pressurized hoppers 103 feeding into transfer duct 62 in parallel. Numerous equipment and control alternatives are thus available, according to the art of pneumatic conveying.

The hot reduced pellets 142 characteristically contain residual coal char and coal ash, which result in significantly greater slag volumes in zones 12, 18 and higher feed rates of fluxing additives for similar slag basicity ratios. In this case, a method for continuous controlled slag discharge, separate from and simultaneously with the liquid iron and steel is particularly advantageous, such as described in my U.S. Pat. No. 5,305,990. Also illustrated is a variation of lance 63 with a straight in-line nozzle 34 and pivot 57 placed closely to opening 21 and approximately intersecting the lance center line, thereby being adapted to allow longitudinal traversing of jet 64 also by rotation of lance 63 about pivot 57, as well as by longitudinal traversing of lance carriage 47. Flattening angles of impingement with the bath surface with increasing distance of insertion is a possible disadvantage of this arrangement.

In another variation of solid-state reduction on a rotating hearth (COMET), alternate layers of fine-sized iron oxides containing pieces and a coal/limestone mixture are heated for reduction coincident with weak agglomeration of the iron fines, whereby a hot size-separation step as in FIG. 5, preferably followed by a lump-breaking step applied to the iron oversize, yields a continuous flow of hot reduced iron adaptable for transfer and injection.

Pressurized air, preferably preheated, is an obvious option as a carrier gas. Since oxygen is oxidizing to iron but also tends to oxidize carbon in preference to iron at typical hot reduced iron temperatures an above, reoxidation of iron would be minimal during the brief period for transfer and entry, also considering that the iron pieces, particularly when in Group A, generally carry a surface layer of finely divided carbon as soot particles or the like. Disadvantages are dissolution of nitrogen in the melt which is potentially very detrimental to product quality, along with some premature and unpredictably variable consumption of carbon which otherwise would be useful for reduction of FeO. Inert carrier gases such as argon are easily applied, to be balanced against relatively high cost and the fact that they would simply dilute gas-solid-liquid melting zone gas stream with non-radiating gases (versus $CO_2$ and $H_2O$ as strong radiators), thereby decreasing effective heat available. Carrier gases may be preheated, or also introduced cold at the temperature of available supply. Considering relative specific heats, heat and mass transfer, cooling hot reduced iron during transfer by carrier gases at ambient temperature generally would be less than 15 per cent, that is, when carrier gas volumes are on the usual order of 4 moles per ton of iron transferred. To this loss must be added the cooling effect on the heat balance for zone 12.

Hot direct reduced iron typically contains carbon in the range from about 1 to 2 per cent, or 20 to 40 pounds per ton, and oxygen from 1 to 3 per cent combined nominally as wustite, FeO, both of which are dispersed throughout the hot reduced iron pieces. Upon introduction and melting in metal bath 32, a carbon boil therefore proceeds as expressed by the reaction $FeO+C=CO+Fe$, requiring heat input of about 80,000 btu per ton of iron for each 1 per cent carbon, and also evolving 600 cubic feet of mainly CO gas from the bath and slag surface into the gas stream. By near-complete post combustion of this CO therein at furnace temperature by reaction with oxygen at near-ambient temperature according to the exothermic reaction $CO+\frac{1}{2}O_2=CO_2$, about 180,000 btu per ton can be released into the gas stream prior to exit from opening 21, considering the CO at 2800 F. bath temperature and the oxygen at ambient temperature. This heat is then available to assist in melting by heat transfer to the metal and slag, and also as residual sensible heat for use in the gas-solid reduction stage. Since there is also a propensity for oxidation of additional iron to form additional FeO in the metal bath and slag, these conditions typically require only supplementary carbon, such as a component of additives 16, in order to meet the carbon content range of most commercial steels in the product metal. To provide a perspective on the relative quantities of heat, the sensible heat content of a steel melt at 2800 F. is approximately 1,200,000 btu per short ton.

The additional oxygen is thus employed mainly for two separate, if related, purposes: (1) post-combustion of CO evolving from a carbon boil within bath 32; and (2) combustion of carrier gases and any accompanying hot reducing gases evolving from jet 64. For purpose (2), the combustible gases to be reacted are essentially concentrated near to the jet 64 impingement location, whereas for purpose (1), they are more uniformly distributed across the surface area of bath 32. Should the total additional oxygen be directed into the area of jet 64 accomplishing purpose (2), transfer and mixing with the general gas stream may be inadequate for purpose (1), therefore a portion or all of this post-combustion oxygen may be supplied by separate gas-stream injection, or as excess oxygen with the fuel via burners 19, 20, or a combination.

The volume of carrier gases and accompanying reducing gases leaked from the gas-solid reduction zone via conduit 61 may vary considerable according to the distance and difference in elevations between the reduction and melting zones, but would usually be between 2 and 8 pound-moles per ton, typically 4 pound-moles or 1500 standard cubic feet. Typically, only a minor portion of these gases reacts with the melt and the major portion evolves into the gas stream around jet 64. The heat potentially releasable by reaction with oxygen depends upon the combustible content, amounting to about 270,240 and 780 btu per cubic foot of contained CO, $H_2$ and $CH_4$ respectively, which is contained in jet 64 at 1500° F. for example, reacting to form $CO_2$ and $H_2O$ at 3300° F. This heat would be zero or close to zero in some circumstances, such as Group B process employing air, $CO_2$ or inert gases as pressurizing and carrier gases.

When the bath C and O are approximately stoichiometrically balanced in the melt, or there is a carbon deficiency, the process does not inherently require oxygen injection into the bath. Any additional carbon required to meet the desired liquid iron or steel carbon content can be injected as an additive 16 or introduced by other means. The total quantity required also reflects additional FeO usually formed by metal and slag oxidation within the melting and refining zones. Options include alternative deoxidizers such as manganese, silicon, calcium, aluminum and special mixes for reacting with part of the FeO, creating reaction products which report in the slag rather than the hot gas stream.

Certain operating practices under Group A and rotary kiln reduction processes under Group B can obtain as low as 0.1 per cent C in the reduced iron, or only two pounds per ton. In such a case, substantial additions of carbon or other deoxidizers can be involved to avoid over-oxidation of the melt and maintain the desired carbon level in the melted product. Conversely, if the carbon level in the hot reduced iron substantially exceeds the stoichiometric amount for reaction with FeO, then bath oxygen injection is the obvious option. A principal difference is a bath heat release of about 40,000 btu per ton for each 1 per cent (20 lb.) of carbon oxidized to CO, rather than 80,000 btu absorbed. Any oxygen contained in carrier gases may be considered essentially equivalent to such separately injected oxygen.

An iron carbide reduction process combination is pertinent for illustration, since the hot reduced iron pieces typically contain both high carbon and high oxygen as iron oxides. As an example, assume that the iron carbide contains 5 per cent carbon and 6.5 per cent oxygen, with 0.5 per cent carbon desired in the melted product. To simplify the illustration, also assume any FeO formed by in-furnace iron oxidation is reacted with other deoxidizers. If 0.5 per cent by weight of the oxygen reports as FeO in the slag, then 4.5 per cent carbon stoichiometrically balances the remaining 6 per cent oxygen for the reaction $C+FeO=Fe+CO$, leaving 0.5 per cent carbon remaining in the melt. The volume of CO generated by this carbon boil would be about 4.5 (600)= 2700 standard cubic feet and the heat absorbed 4.5 (80,000)=360,000 btu per ton. Post-combustion with approximately 1350 cubic feet of gas stream injected oxygen is required for reaction of the CO forming $CO_2$, accompanied by a heat release of about 4.5 (180,000)=810,000 btu per ton of steel melted. Since the heat in the gas stream is then also utilized in the reduction zone circuit, high heat transfer efficiency (HTE) of this heat into the melt is beneficial but not critical to the overall heat efficiency of the process. The HTE however, is substantially higher anyway than in an EAF or BOF with post-combustion because of the elongated melting zone shape and rotating furnace walls also agitating and transferring heat into the bath, and the continuous, essentially steady-state operation. Low-oxygen as an objective in the art of iron carbide reduction markedly reduces the production rate attainable, whereby designing the melting zone process operation to handle high oxygen enables much higher production rates to be obtained from similar reduction-stage equipment, reflected in lower capital costs.

Group A processes characteristically have pressurized and preheated recirculating top gases 50 containing combustibles CO and $H_2$ readily available for use as carrier gases, and also the hot reducing gases 5 enriched with fresh hydrocarbons. These gases can be suitable and potentially advantageous, particularly if their combustion within zone 12 is controlled to take place mainly near the location of highest process heat requirements and proceeds substantially to completion in-process, at the same time avoiding exhaustion of unburned combustibles into the atmosphere. Hydrogen can dissolve in the melt up to the equilibrium value with molten iron at the partial pressure of $H_2$ present in the carrier gas, that is, usually in the range 8–16 parts per million corresponding to 25–50 per cent $H_2$ in the carrier gas, as governed by known thermodynamics of iron and steelmaking. At least partial removal is effected by the carbon boil action, as well as any subsequent vacuum stage such as in vacuum vessel 29, but any possible negative product quality effect should be evaluated for the particular process and end product involved.

Figure 7:
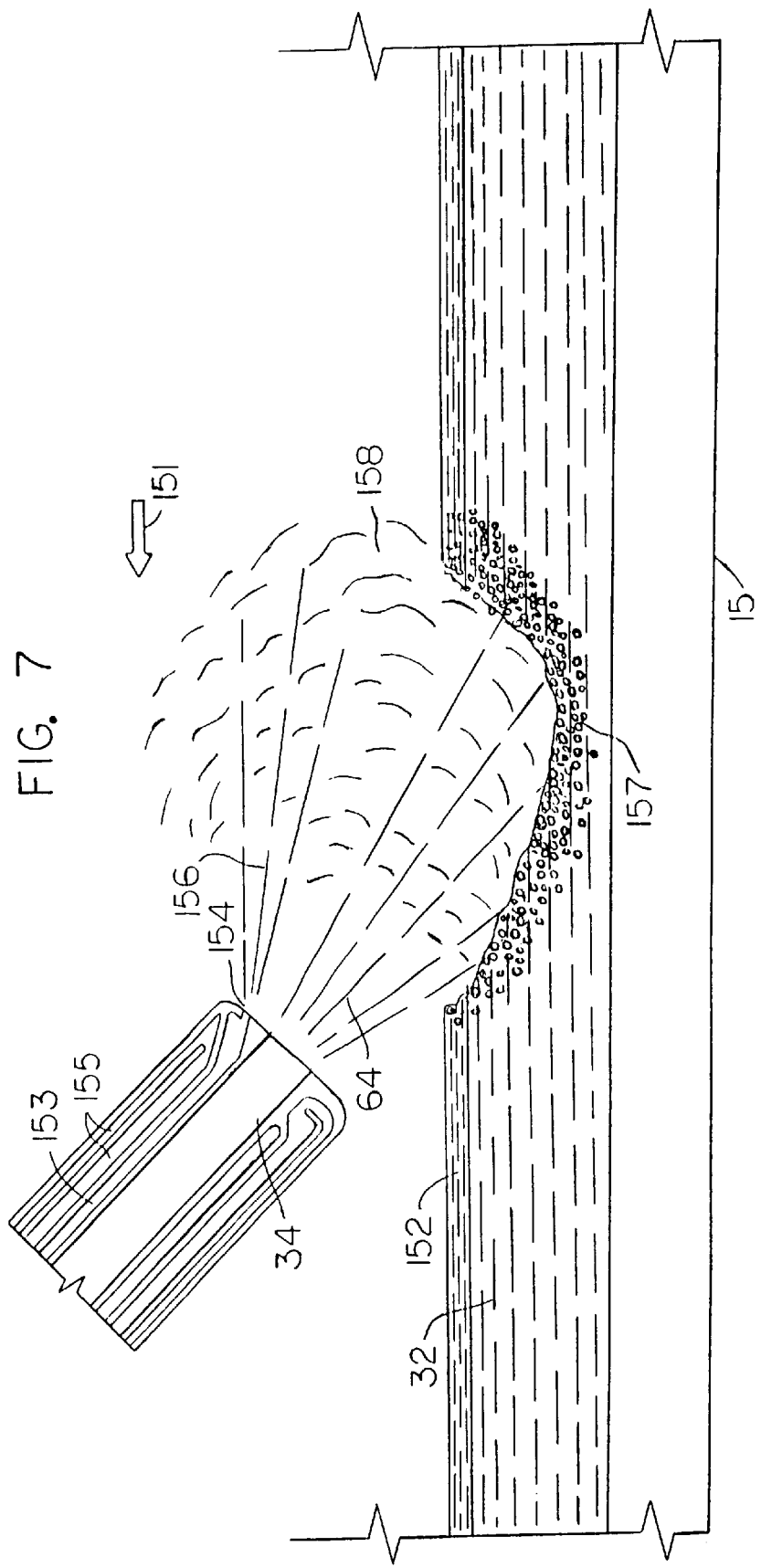
FIG. 7 is a partial sectional side view illustration of a solids injection lance nozzle embodiment in operation, which is also adapted for oxygen injection into the gas stream.

FIG. 7 illustrates a solids injection lance embodiment also adapted to introduce gas-stream injected oxygen for quick mixing and reaction in zone 12 with combustibles contained in carrier gases. Nozzle 34 from lance 63 is directed downward at an acute angle to the surface of the liquid metal bath, which is about 45 degrees as illustrated, and the jet 64 of carrier gases, hot reduced iron and additives separates the slag layer 152 and penetrates into bath 32 creating a turbulent cavity 157. Nozzle 34 carries an oxygen injection annulus 153 and is cooled by a water jacket 155 according to known lancing practices. Oxygen jet 156 may be emitted from an annular or semi-annular slit 154 as illustrated, or from an individual nozzle or plurality of nozzles 159 (see FIG. 2), preferably at relatively low pressure and velocity since metal or slag penetration is not sought, but rather interception and reaction with spent carrier gases and any accompanying hot reducing gases 158 as they evolve and rise above the bath, following dissipation of jet 64 kinetic energy, and carrier gas emergence from cavity 157. Accordingly, mixing and combustion between carrier-gas combustibles and oxygen, with consequent heat release, mainly takes place immediately above the bath area containing the greatest concentration of unmelted iron. Oxygen delivered by nozzle such as 154 could, or course, alternatively be delivered by means of a separate oxygen lance to that of lance 63.

Figure 8:
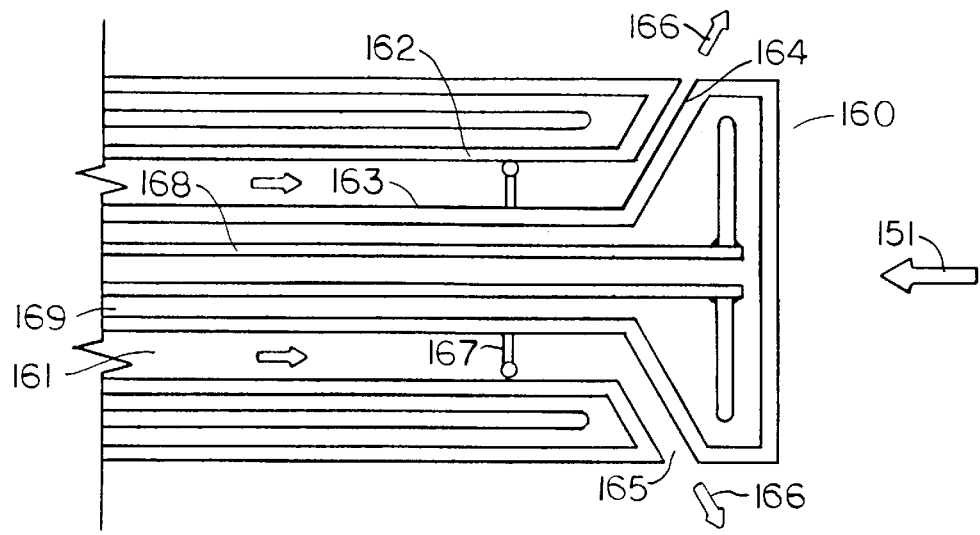
FIG. 8 is a partial sectional side view illustration of a gas stream oxygen lance injection nozzle adapted to distribute oxygen for post combustion across the gas stream.
Figure 9:
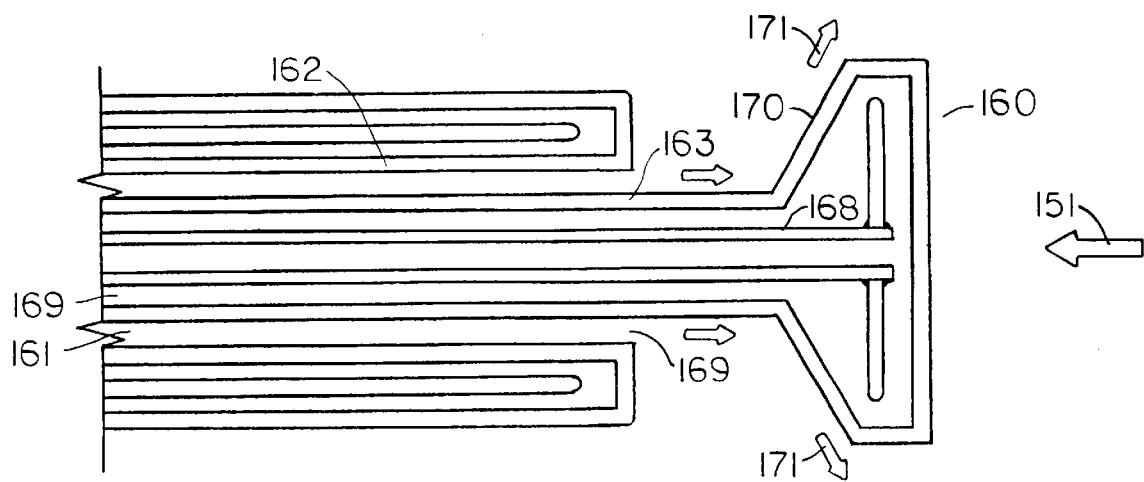
FIG. 9 illustrates an alternative embodiment of a nozzle as in FIG. 8.

FIG. 8 illustrates a gas stream oxygen injection lance nozzle 160 particularly adapted to intercept and mix the oxygen with the general gas stream flow 151, favoring purpose (1) post-combustion of the CO evolving from a carbon boil within the bath. Oxygen is introduced via annulus 161 between water-cooled cylindrical outer pipe 162 and water-cooled inner pipe 163 carrying an oxygen jet flow rate, direction and distribution control disc 164. Annular slit nozzle opening 165 is thereby defined between the end of outer pipe 162 and the back face of disc 164, through which oxygen jet 166 fans radially outwards in a continuous curtain of oxygen transversely spanning across the axially flowing gas stream. Disc 164 is preferably water-cooled, such as by cooling water supplied by internal water pipe 168 and returned via inner pipe annulus 169. Opening 165 can be shaped to enhance effectiveness of mixing with the gas stream to increase reaction with combustibles. For example, in the illustration, slit opening 165 is angled upstream at about 30° to the perpendicular, emitting a cone-shaped curtain radially outwards which is also countercurrent to the general gas stream flow. Also, the sector of opening 165 directing oxygen jet 166 downwards towards bath 32 is made wider than the sector directing the jet upwards, thereby delivering a higher volume of oxygen to directly intercept the CO evolving from the bath surface. The width of opening 165 and thereby the oxygen flow rate at a selected pressure and velocity, can be varied by axial location adjustment of pipe 163 by axial sliding of inner pipe locating guide 167 to different locations within outer pipe 162, for example, by applying different thicknesses of spacer washers against an entry-end flange of inner pipe 163. FIG. 9 illustrates a gas stream oxygen lance injection nozzle embodiment variation, in which a similarly-mounted disc acts only as a deflector disc 170, adapted to deflect oxygen jet 171 outwards projecting an annular oxygen curtain across the furnace gas stream cross-section.

Such gas stream oxygen injection provides for the post-combustion oxygen intersecting the bath surface transversely to the direction of metal flow, as well as the complete gas stream cross section. The hot reacted gas mixture then flows for a significant distance simultaneously in contact and heating the partly melted bath and the furnace walls which, in turn, continuously agitate the bath and pass on this wall heat from post-combustion into the bath when rotating under it. The invention thus provides the clear advantage of increasing PCD and HTE over prior art processes, for example, electric-arc furnace and oxygen converter process technologies.

When the carrier gases contain substantial quantities of combustibles, two separate gas stream oxygen injection jets can be included, one jet such as in FIG. 7 focused on carrier gases and any accompanying hot reducing gases evolved from jet 64 and the other, such as in FIG. 8 providing more uniform coverage of the gas stream cross section for post combustion of CO evolved from the carbon boil of C and residual FeO contained in the hot reduced iron. Continuous off-gas analysis of the exited gas stream then enables adjustment of the injection location and operating parameters for this additional oxygen. Gas stream injected oxygen may also be applied for combustion of fuel from burners 19, 20. For example, burner 20 could be fired fuel-rich, minimizing refining zone 18 oxidation as a side benefit, with the excess fuel then combusted by gas stream injected oxygen within zone 12, over and above that required for foregoing purposes (1)+(2). Charge end burner 19 and gas stream oxygen lances 160 can also be adapted for adjustable longitudinal positioning, for example, juxtaposed and carried by an assembly substantially identical to that for lance 63, thus providing means to adjust the distribution of combustion reactions and heat release within zone 12. For example, referring to FIGS. 1 and 2, with nozzle 34 and jet 64 traversing between Lmin and Lmax, the burner 19 nozzle could be located just short of Lmax and lance 143 nozzle just beyond Lmin. Adjusting these locations during operation and observing the effect on the temperature and composition of gases 33 enables the most effective positions to be established and maintained. Many other firing variations and combinations are obviously available.

Bath oxygen injection lance nozzles characteristically operate at relatively high pressures and velocities in order to obtain good bath penetration and agitation, must often at supersonic velocity according to known parameters in the art of bath oxygen injection, and generally use high-purity cryogenic oxygen to avoid nitrogen pickup in the bath. Gas stream injected oxygen is most effective at much lower pressure and velocity, also to avoid unwanted bath and slag oxidation reactions and erosion of refractories. Since bath gas-liquid mixing is not involved, lower oxygen purity, such as characteristic of molecular-sieve type oxygen generation, is also suitable. When utilizing at least 80 per cent pure oxygen for combustion and injection, average longitudinal hot gas stream velocities along melting zone 12 are moderate, typically about 15 miles per hour of the hot low-density gases, and usually within a range of 10 to 30 miles per hour. For a nozzle such as FIG. 8, a nozzle pressure drop of 1 psi (27.7 in. water column) creates a nozzle exit velocity of about 150 miles per hour for the annular curtain of oxygen, as typically adequate to obtain good mixing with the gas stream out to the stream perimeter. A 7 in. water column pressure drop translates to about 75 miles per hour exit velocity which can also be suitably effective, thus operating pressures can vary considerably, but would usually be less than 5 psi, whereas bath oxygen injection nozzles would operate in a much higher pressure range.

Group B processes lack a ready carrier gas for bath solids injection and natural gas, as commonly available by pipeline at high pressure, is an obvious option. Because of the high calorific value, however, the volume of natural gas required for carrier gases approximates that for the total melting heat requirement for zone 12. Whereas longitudinal traversing of lance 64 is an advantage considering mass transfer and charge distribution, when acting as the principal source of melting heat, it would be at least partially disruptive of heat and hot gas distribution within zone 12. Pressurizing exhaust gases 112 is another option, as are inert gases or $CO_2$ as carrier gases. Again considering Group A, hot reducing gases 5 would typically supply on the order of half the melting zone 12 heat requirement, potentially also somewhat disruptive. Dewatered and recirculated top gases 50, at about one-quarter or less applied as in FIG. 7 is perhaps a cost-effective and practical compromise selection for Group A. Melting heat requirements decrease with increasing percentages of carbon in the hot reduced iron. They increase as the percentage of scrap or other metallic charge 14 is increased such as by conveyor 13, increasing the tolerance for higher carrier gas combustibles.

Hot reduced iron and additive transfer operating parameters follow the natural laws and known principles governing pneumatic solids conveying, solids fluidization and injection into liquid baths. The minimum gas velocity within duct 62 clearly must exceed the saltation velocity. The ratio of mass of hot reduced iron to mass of carrier gas is typically 15–20 but can range from as low as 5 to higher than 30, such as in the course of dense-phase transfer of relatively fine-sized pieces, as characteristic of fluidized bed hot-reduced iron or iron carbide. The velocity of jet 64 is influenced by the desired depth of bath penetration which, because the mass ratio of carrier gas to solids is quite low, depends mainly upon the flow rate and velocity of the solids. Slag separation and creation of a minimum cavity in the bath surface would usually require a vertically downward component of solids velocity exceeding about 20, and typically 30 to 60, miles per hour at bath entry. Nozzle 34 can be straight or can be converging or of Venturi type to increase penetration, or diverging to increase bath area coverage. A typical example velocity of transfer and injection would include a carrier gas flow velocity of 50 miles per hour, projecting a flow of 60 short tons per hour of hot reduced iron through a 6-inch diameter transfer duct and nozzle into the partially melted metal bath 32. Since hot reduced iron or iron carbide is abrasive, abrasion within transfer duct 62 and lance 63 accelerating rapidly with increasing velocity, relatively low velocities are favored to reduce maintenance, but also selected to realize consistent immersion of reduced iron pieces in bath 32.

Although venturi eductors for pneumatic solids conveying are usually characterized by a relatively high ratio of carrier gas to solids, which can be a serious disadvantage if applied as feeders for the subject pneumatic transfer and injection application, they can offer a viable option in cases when reduction and melting are close together, with the gas-solid reduction zone positioned at a significantly higher elevation than the melting zone. FIGS. 10 and 11 present a variation of the flowsheet of FIG. 5 illustrating such an application, wherein the fine-sized materials are screened out by a trommel 172 comprising a cylindrical section of the rotary reactor inside walls, rather than by a vibrating screen. The oversized reduced pellets 99 pass through a funnel chute 173, then drop vertically inside down-pipe 174 feeding the inlet of eductor 175, incorporating carrier gas nozzle 176, venturi throat 177 and discharge pipe 178 comprising the inlet line to the solids injection lance 63. In the illustrated example, nozzle 176 is supplied with carrier gas by a high-temperature blower 179 including a suction inlet duct 180 withdrawing hot carrier gas from within the gas-solid reduction zone.

Eductor inefficiency and high dilution ratio is related to the requirement to accelerate solid particles or pellets from a closely-packed essentially stationary position, whereas the reduced iron pellets in FIGS. 10 and 11 are already moving at substantial velocity in the conveying direction at entry into eductor 175. Gravity is the principal force acting on the reduced iron pellets dropping through down-pipe 174, according to the well known relationship velocity=2 gs when S is the distance dropped, tempered only by resistance of gases, side-wall friction and directional changes within the pipe. For example, a 4-meter free fall results in a velocity about 20 miles per hour, or nearly half that of a typical injection velocity. Such solid inlet velocities entering the eductor substantially decrease the carrier gas volume and pressure requirements and, accordingly, transfer duct and lance nozzle diameters.

Example parameters for a 20 ton-per-hour system may be illustrated as follows:

| Parameter | Target | Range |
|---|---|---|
| Vertical drop | 12 ft. | 10–15 ft. |
| Down-pipe diameter | 3 in. | 2.5–3.5 in. |
| Carrier-gas nozzle diameter | 1 in. | 0.8 –1.2 in. |
| Venturi throat diameter | 2 in. | 1 .8–2.5 in. |
| Carrier gas pressure | 2 psig | 1.5–3 psig. |
| Transfer duct diameter | 4 in. | 3.5–4.5 in. |
| Transfer duct velocity | 4000 ft.per.min. | 3500–4500 ft.min. |

A very large number of modifications and variations to the process for direct iron and steelmaking are available and obvious to those skilled in the art. For example, referring to type B process flowsheet FIGS. 5, 6 and 10, the pneumatic charge transfer and injection system depicted in any one is also applicable in either of the other two. Other variations could include charging all of the solid reductant and sulphur-absorbent materials for rotary kiln reduction as in FIGS. 5 and 6, as a constituent of the pellets, eliminating the requirement for screening out excess coal, ash and lime-dolomite, with process then very similar to the FIG. 6 rotary hearth reduction, except for the type of gas-solid reaction zone equipment. Alternatively, with all or a major portion of the reductant charged as discrete particles, the entire mixture could still be passed on into zone 12 also without screening, to yield a high-carbon pig iron hot metal product, accompanied by a greater portion of the melting heat in the gas-solid-liquid melting zone furnished by the hot solid carbonaceous material transferred with the charge. These are only a few of the many variations and equivalencies available without departing from the scope of the invention defined in the appended claims.

I claim:

1. An apparatus for making iron and steel directly from iron oxides comprising the combination of:
    a reduction reactor containing a gas-solid reduction zone adapted for reducing iron oxides containing pieces yielding hot solid reduced iron pieces;
    an elongate rotary furnace containing a gas-solid-liquid melting zone adapted for melting said hot solid reduced iron pieces within a partially melted metal bath;
    a transfer duct adapted for transferring said hot solid reduced iron pieces entrained in pressurized carrier gases;
    a conduit adapted for receiving said hot solid reduced iron pieces from said reduction reactor, and feeding said pieces into said transfer duct; and
    a solid injection lance connected into an outlet from said transfer duct and projecting into said melting zone through an annular end opening of said rotary furnace having a nozzle directed downwards adapted for emitting said hot reduced iron pieces and carrier gases downwards penetrating into said partially melted metal bath.

2. An apparatus for making iron and steel directly from iron oxides comprising the combustion of:
    a reduction reactor containing a gas-solid reduction zone adapted for reducing iron oxides containing pieces yeilding hot solid reduced iron pieces;
    an elongate rotary furnace containing a gas-solid liquid melting zone adapted for melting said hot solid reduced iron pieces within a partially melted metal bath;
    a transfer duct adapted for transferring said hot solid reduced iron pieces entrained in pressurized carrier gases;
    a conduit adapted for receiving said hot solid reduced iron pieces from said reduction reactor, and feeding said pieces into said transfer duct;
    a solids injection lance connected into an outlet from said transfer duct and projecting into said melting zone through an annular end opening of said rotary furnace having a nozzle directed downwards adapted for emitting said hot reduced iron pieces and carrier gases downwards pentrating into said partially melted metal bath; and
    means for traversing said solids injection lance longitudinally backwards and forwards along said melting zone adapted to distribute the pentration and entry into said bath of said reduced iron pieces and carrier gas emitted said jet along said melting zone.

3. An apparatus for making iron and steel directly from iron oxides comprising the combination of:
    a reduction reactor containing a gas-solid reduction zone adapted for reducing iron oxides containing pieces yielding hot solid reduced iron pieces;
    an elongate rotary furnace containing a gas-solid-liquid melting zone adapted for melting said hot solid reduced iron pieces within a partially melted metal bath;
    a transfer duct adapted for transferring said hot solid reduced iron pieces entrained in pressurized carrier gases;
    at least one surge hopper intermediate between said reduction reactor and said rotary furnace adapted to temporarily contain and accumulate a portion of said hot reduced iron in-process means for transferring said hot reduced iron from said reduction reactor into said surge hopper;
    means for discharging said hot reduced iron pieces from said surge hopper and introducing them into said transfer duct; and
    a solids injection lance connected into an outlet from said transfer duct and projecting into said melting zone through an annular end opening of said rotary furnace having a nozzle directed downwards adapted for emitting said hot reduced iron pieces and carrier gases downwards penetrating into said partially melted metal bath.

4. An apparatus for making iron and steel directly from iron oxides comprising the combination of:
    a reduction reactor containing a gas-solid reduction zone adapted for reducing iron oxides containing pieces yielding hot solid reduced iron pieces;
    an elongate rotary furnace containing a gas-solid-liquid melting zone adapted for melting said hot solid reduced iron pieces within a partially melted metal bath;
    a surge buffer hopper adapted for receiving and temprarily storing said hot reduced iron pieces from said reduction reactor;
    a continously pressurized hopper containing hot solid reduced iron pieces and carrier gases with an outlet conduit including valving adapted to control the flow rate of said hot reduced iron pieces therethrough;

a transfer duct adapted for receiving said hot reduced iron pieces from said outlet conduit of said continuously pressurized hopper and connecting into a solids injection lance connected into an outlet from said transfer duct and projecting into said melting zone through an annular end opening of said rotary furnace having a nozzle directed downwards adapted for emitting said hot reduced iron pieces and carrier gases downwards penetrating into said partially melted bath;

an alternatively pressurized hopper with an inlet conduit connecting into an outlet from said surge buffer hopper including inlet flow interruption valving and sealing means and with an outlet conduit connecting into said continuously pressurized hopper including outlet flow interception valving and sealing means; and interruption valving control means adapted to open said outlet flow interruption valving during time when said inlet interruption valving is closed, thereby being adapted to maintain elevated pressure and flow of said hot reduced iron into said transfer duct during filling of said continuously pressurized hopper.

5. An apparatus for making iron and steel directly from iron oxides comprising the combination of:

a reduction reactor containing a gas-solid reduction zone adapted for reducing iron oxides containing pieces yielding hot solid reduced iron pieces;

an elongate rotary furnace containing a gas-solid-liquid melting zone adapted for melting said hot solid reduced iron pieces within a partially melted metal bath;

a transfer duct adapted for transferring said hot solid reduced iron pieces entrained in pressurized carrier gases;

a conduit adapted for receiving said hot solid reduced iron pieces from said reduction reactor, and feeding said pieces into said transfer duct;

at least one separate inlet into said transfer duct for at least a portion of said pressurized carrier gases separately from said conduit; and a solids injection lance connected into an outlet from said transfer duct and projecting into said melting zone through an annular end opening of said rotary furnace having a nozzle directed downwards adapted for emitting said hot reduced iron pieces and carrier gases downwards penetrating into said partially melted metal bath.

6. An apparatus according to claim 3, 4, or 5 including means for traversing said solids injection lance longitudinally backwards and forwards along said melting zone adapted to distribute the penetration and entry into said bath of said reduced iron pieces and carrier gas emitted from said jet along said melting zone.

7. An apparatus according to claim 1, 2, 3, 4 or 5 wherein said conduit includes a diverter valve adapted to divert said hot reduced iron into an alternative conduit adapted for exit to cooling and alternative processing of a portion of said hot solid reduced iron.

8. An apparatus according to claim 1, 2, 3, 4 or 5 wherein said conduit includes at least one additive conduit fed from a hopper and flow control valve adapted for introducing iron and steelmaking additives into said transfer duct.

9. An apparatus according to claim 1, 2, 3, 4 or 5 including a feed conveyor supported on a longitudinal track with discharge end inserted longitudinally into said melting zone through an end opening of said rotary furnace with means for forwards and backwards traversing of said feed conveyor and thereby longitudinal distribution of the entry position of charge materials within said gas-solid-liquid melting zone.

10. An apparatus according to claim 1, 2, 3, 4 or 5 wherein said reduction reactor employs pressurized hot reducing gases percolated through a moving bed of said iron oxides containing pieces within said gas-solid reaction zone and exhausts reacted top gases, which includes a compressor-blower adapted to compress and re-pressurize said top gases, and also includes a conduit and control valve for a portion of said top gases adapted to introduce said portion of said top gases into said transfer duct to comprise said pressurized carrier gases adapted for transfer and injection of said hot reduced iron.

11. An apparatus according to claim 1, 2, 3, 4 or 5 wherein said conduit includes valve means adapted to effect passage of said hot reduced iron whilst restricting the flow of gases due to differences in gas pressure between said reduction reactor and said transfer duct.

12. An apparatus according to claim 1, 2, 3, 4 or 5 wherein said reduction reactor employs pressurized hot reducing gases percolated through a moving bed of said iron oxides containing pieces within said gas-solid reaction zone which includes a reducing gas generator fired by at least one inlet for fresh hydrocarbons and at least one inlet for fresh oxygen adapted to effect partial combustion within said generator forming reducing gases CO and $H_2$ for introduction into gas-solid reaction zone within said reduction reactor.

13. An apparatus according to claim 1, 2, 3, 4 or 5 which includes an exhaust transfer duct adapted for transferring hot exhaust gases from said rotary furnace into said reduction reactor.

14. An apparatus according to claim 1, 2, 3, 4 or 5 wherein said reduction reactor comprises a rotary kiln adapted for introducing solid carbonaceous reductant into said gas-solid reduction zone and heating said iron oxides and reductant for reaction at approximate ambient pressure, including an enclosed hot screen deck for separating and discharging relatively fine-sized excess carbonaceous reductant whilst retaining relatively coarse-sized hot reduced iron pieces, in combination with means for transferring said hot reduced iron pieces into said transfer duct whilst substantially blocking flow of said pressurized carrier gases into said reduction reactor.

15. An apparatus according to claim 1, 2, 3, 4 or 5 which includes an eductor comprising a carrier gas nozzle, venturi throat and discharge pipe comprising the inlet line to said transfer duct and injection lance, adapted for receiving said hot reduced iron descending by gravity from a down-pipe, adapted to entrain said hot reduced iron by carrier gas for projection along said transfer duct through said lance and nozzle into said bath.

16. An apparatus according to claim 1, 2, 3, 4 or 5 wherein said conduit means includes a hopper adapted for cyclically receiving said hot reduced iron from said reduction reactor, then pneumatically pressurizing and discharging under pressure into a continuously pressurized hopper adapted for feeding said hot reduced iron into said transfer duct for projection through said lance and nozzle into said bath.

17. An apparatus according to claim 1, 2, 3, 4 or 5 also including an oxygen-injection lance adapted for post combustion of CO evolved from said bath thereby forming $CO_2$ prior to exit of hot combustion products from said reactor by way of said annular end openings.

18. An apparatus according to claim 1, 2, 3, 4 or 5 including an oxygen injection lance comprising a water-cooled outer pipe and an inner pipe terminating in a distribution control disc defining an annular slit opening between the exit end face of said inner and outer pipes and the back face of said disc, adapted to emit a curtain of oxygen radially outwards transversely across the gas stream of hot furnace gases.

19. An apparatus according to claim 1, 2, 3, 4 or 5 which also comprises an external vacuum vessel having a siphon tube adapted for projection through an annular end opening of said rotary furnace down into said metal bath for discharging liquid iron and steel from said furnace.

20. An apparatus according to claim 1, 2, 3, 4 or 5 wherein said rotary furnace also includes a gas-liquid refining zone and a discharge end burner directed into said refining zone adapted to control the metal refining temperature essentially independently of the heat requirements for melting.

21. An apparatus according to claim 1, 2, 3, 4 or 5 wherein said rotary furnace also includes a gas-liquid refining zone proximate the furnace discharge end having a discharge end burner directed into said refining zone; with said melting zone proximate the furnace charge end having a charge end burner directed into said melting zone;

an oxygen lance directed into said melting zone; and exhausting means effecting flow of the hot furnace gases within said furnace from said refining zone through said melting zone exiting through the annular end opening at the charge end of said furnace.

22. An apparatus according to claim 1, 2, 3, 4 or 5 including a moving carriage running on a longitudinal guide track adjacent to an annular end opening of said rotary furnace supporting said solids injection lance with means for actuating the longitudinal traversing of said lance and carriage alternately backwards and forwards along said track during melting.

23. An apparatus according to claim 1, 2, 3, 4 or 5 including a moving carriage running on a longitudinal guide track adjacent to an annular end opening of said rotary furnace supporting said solids injection lance nozzle with means for actuating the longitudinal traversing of said lance and carriage alternately backwards and forwards along said track during melting; and means for vertically adjusting the position of at least one end of said guide track adapted to adjust the vertical distance of said nozzle in relation to the surface level of said bath.

\* \* \* \* \*